United States Patent Office.

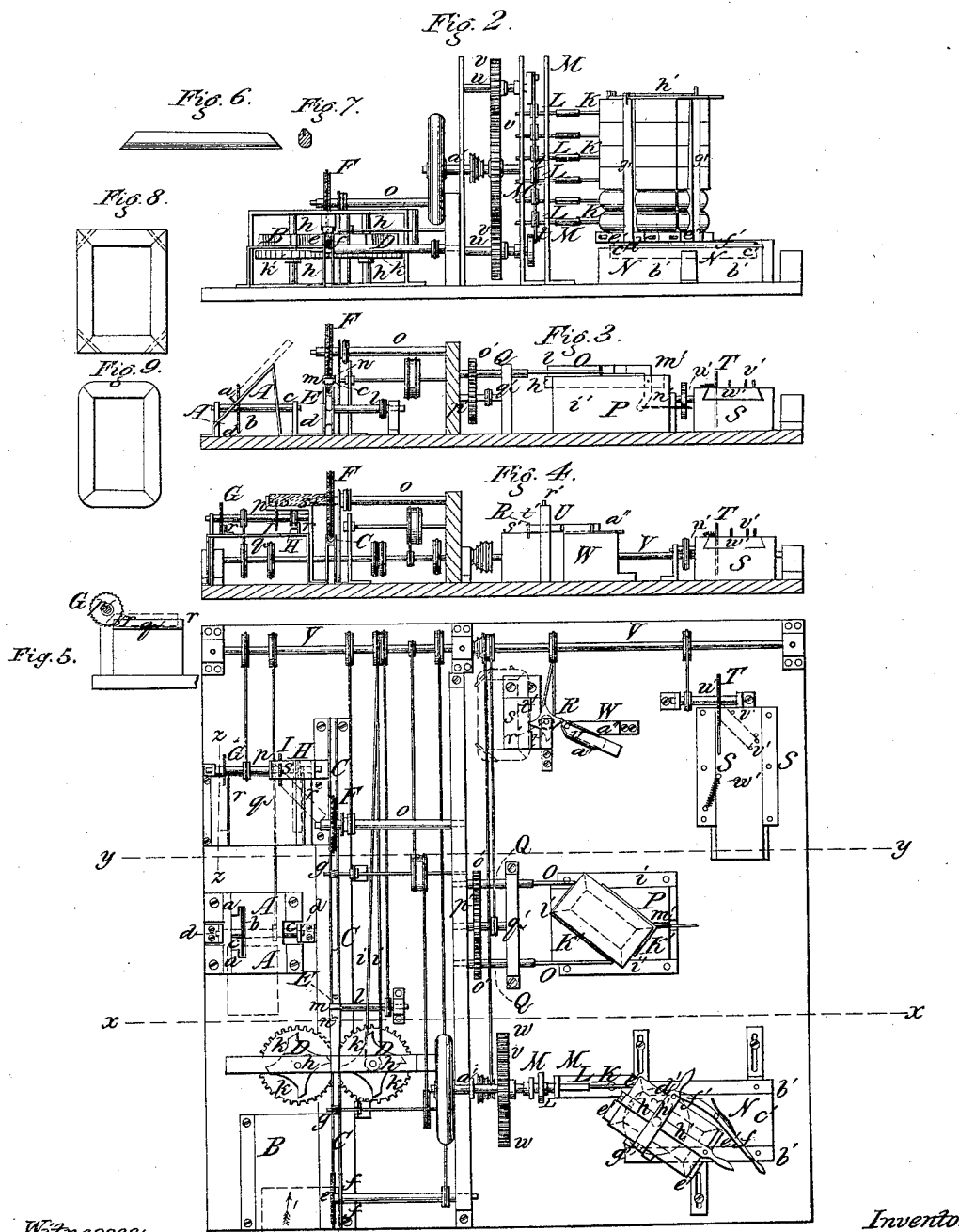

WILLIAM KESTER, OF CHERRYVILLE, PENNSYLVANIA.

Letters Patent No. 67,316, dated July 30, 1867.

---

IMPROVEMENT IN MACHINES FOR MAKING SLATE-FRAMES.

---

The Schedule referred to in these Letters Patent and making part of the same.

---

TO ALL WHOM IT MAY CONCERN:

Be it known that I, WILLIAM KESTER, of Cherryville, in the county of Northampton, and State of Pennsylvania, have invented a new and improved Machine for Making School-Slate Frames; and I do hereby declare that the following is a full, clear, and exact description thereof, which will enable others skilled in the art to make and use the same, reference being had to the accompanying drawings, forming part of this specification, in which—

Figure 1 is a plan or top view of my improved machine for making school-slate frames.

Figure 2 is a side elevation of the same.

Figure 3 is a vertical cross-section of the same, the plane of section being indicated by the line $x\ x$, fig. 1.

Figure 4 is a vertical cross-section of the same, the plane of section being indicated by the line $y\ y$.

Figure 5 is a detail vertical sectional view, taken on the line $z\ z$, fig. 1.

Figures 6, 7, 8, and 9 are detail views to be hereinafter referred to.

Similar letters of reference indicate like parts.

This invention relates to a machine which is used to saw, plane, bore, tongue and groove, and join the pieces of wood which are used on school-slate frames; and the invention consists in such an arrangement of the parts which compose the machine that the said frames can be made thereon from rough and unplaned boards, and be perfect and satisfactory as regards their appearance as well as their construction, strength, and form.

A board of the required thickness is placed upon an inclined bed, A, which is made of metal or other suitable material, and set up at an angle of forty-five degrees, as is shown in fig. 3. A stop, $a$, is arranged near the lower portion of the bed A, and at a right angle to the same, and serves as a rest for the board that may be placed upon the bed. The upper part of a circular saw, $b$, which is mounted upon a horizontal shaft, $c$, that has its bearings in suitable uprights $d$, passes through the bed A at the junction of the stop $a$ with the said bed, and serves to bevel the edge on each end of the board to an angle of forty-five degrees, cutting off a triangular strip from the said board as the same is fed to the saw, in the position described, and as indicated clearly in fig. 3.

The object of this device is to bevel the edges at the ends of the board, so that when the latter is cut into strips the said strips will be already mitred without the use of a mitre-box, in which only one strip cut can be mitred at a time, while in the above device as many as are contained in a board are mitred at once.

The board, when thus bevelled, is sawed into strips of suitable width on a table, B, in which a circular saw, $e$, is arranged, and a guide-plate, $f$. The board is moved in the direction of the arrow 1, fig. 1, towards the saw, and is held against the plate $f$. The distance between the saw and plate will then indicate the width of the strip to be sawed. A trough, C, the bottom of which is on a level with the table B, and one side of which is a continuation of the plate $f$, receives the sawed strip, and a series of feed-rollers, $g\ g$, are arranged above the same, whereby the strip is moved ahead. These friction-rollers, as well as the saw $e$, are mounted on suitable horizontal shafts which are driven by belts or other suitable machinery.

D D are two revolving cutters, which are mounted on vertical shafts, $h\ h$, and are arranged on either side of the trough C, so that as they revolve the sides of the strip that passes through the trough are planed. To one of the shafts $h$ is the motion imparted by a belt, $i$, and is transferred to the other shaft $h$ by means of cog-wheels, $k\ k$, which are mounted upon the said shaft, and are exactly alike, insuring equal velocity of the shaft $h$. The sides of the trough are of course not continued where the cutters D D operate. After the sides of the wooden strip have been planed, the lower edge of the same is rounded by a revolving cutter, E, which is mounted below the trough C upon a horizontal shaft, $l$, and whose cutting edge is concave, as shown, so as to round off the lower edge of the strip, as is clearly indicated in fig. 3. The strip, while passing over the cutter E, is held down by a roller, $m$, which is pressed down by a spring, $n$.

A wheel, F, is mounted above the trough C, being mounted upon a horizontal shaft, $o$, which is laid across the direction of the trough, and above the same. A V-shaped groove is formed in the periphery of the wheel F, and from the centre of the said groove a narrow, straight tongue is made to project, as is clearly shown in the drawing. The tongue as well as the sides of the V-shaped groove are cutters, so that the upper edge of the strip of wood is shaped by them. The tongue cuts a groove along the centre of the upper surface, into which groove, when the frame is completed, the edges of the slate are fitted. The sides of the V-shaped groove bevel down the edge, and the strip, after having passed from the inclined bed A, over the table B, and through the trough C between the cutters D, above the cutter E and under the cutter F, has the shape and form indicated in figs. 6 and 7, the former being a side view, the latter a cross-section of the strip. The length of the board from which the strips are cut indicates of course the length of the strips. Two different lengths are used for the common oblong slate-frames.

The different pieces are joined together by leaving a tenon on the mitred end of one strip, which fits into a groove or mortise cut into the mitred end of the other strip. For forming these tenons and grooves I have arranged the cutters or saws G, H, and I, all of which are or may be mounted on one common shaft, $p$, as is clearly shown in fig. 4. A table, $q$, is arranged in front of the shaft $p$, its upper surface being almost exactly on a level with the lower edge of the cutters G and H, and, if not, plates are placed upon it, or it may be made movable up and down, which will bring it to the required height. The bevelled end of one strip is fed towards the saw G, as shown in fig. 5, and is guided on a plate, $r$, so that the saw will begin to rip the strip in two. Stops or other devices may be arranged, whereby the depth of the cut will be regulated. The lower edge of the strip being in line, or almost so, with the lower edge of the saw G, the latter will cut a groove into the end of the strip, the termination of which will be very near to an inclined line, as is understood by referring to fig. 5.

The cutter H is a double saw, or two saws, mounted near to each other on the shaft $p$. Another strip is fed to the same in a manner similar to that above described. The two saws make two incisions into the end of the strip, and the saw I is used to cut off those pieces that might have been left standing on both sides of the saws. The piece left between the saws will be the tenon required on the ends of some strips, while the saw G forms the grooves in the ends of other strips. A platform, $s$, is arranged above the shaft $p$, and the strip is placed upon it, in the manner shown in fig. 1. The upper edge of the saw I must not project further above the top of the platform $s$ than the thickness of the wood left on either side of the cutters H on the strip.

The strips are now ready to be put together, so that four of them form a slate frame, the shape of which is indicated in fig. 8, which is a plan or top view of a frame that is put together from strips which have been prepared in the manner above described. The four strips are held together by means of wooden pins, which pass diagonally across the corners of the frame, in the manner indicated by red lines in fig. 8. To insert these pegs it is necessary to bore holes through the corners of the frame in the desired position and place. To do this, I have arranged a series of revolving drills, K K, which are held on the ends of a series of crank-shafts, L L. The latter have their bearings in two upright posts or bars, M M, and are arranged directly above each other, the distance between the centres of each pair of shafts being almost equal to the thickness of the wood in the slate frames. The cranks of all the shafts L are fitted through one rod or bar, $t$, the upper end of which is pivoted to an eccentric on a horizontal shaft, $u$, as shown in fig. 2. The lower end of the bar $t$ may also be pivoted to an eccentric on a horizontal shaft, $u$, and the said bar will thus be held in a vertical position at all times. A pinion, $v$, is mounted on each shaft $u$, and a toothed wheel, $w$, which is mounted on a horizontal shaft, $a'$, meshes into the pinions $v$ $v$, and thus imparts motion to the shafts $u$, and consequently to the shafts L and drills K. An equal number of slate-frames to the number of drills K is placed upon a sliding and revolving plate or bed, N, which more particularly consists of four distinct parts, $b'$, $c'$, $d'$, and $e'$.

$b'$ is a sideways adjustable bed, which is firmly secured to the floor of the room in which the machine is set up, or otherwise arranged so that it can be moved sideways. It is provided with a dove-tail groove, in which a dove-tail tenon $c'$ is held, so that the same can slide in the direction of the drills K. Upon the sliding-plate $c'$ is pivoted a horizontal disk, $d'$, which has four notches around its periphery at equal distances from each other, a spring-catch, $f'$, fitting into one of the notches, thus preventing the said plate from revolving. Two pins are projecting from the upper face of the disk $d'$, and fit into two holes which are arranged in an oblong plate, $e'$, so that when the latter is placed upon the disk $d'$ it will be revolved with the same, and will slide back and forth with the plate $c'$.

To each side of the plate $e'$ is hinged a bar, $g'$. The slate-frames are placed one above the other upon the plate $e'$, and are then held in position by the arms $g'$, which are arranged vertically along the sides of the frames, and are locked on top by horizontal bars $h'$, as shown in fig. 1. The frames are thus locked to the plate $e'$ in the proper position, which may be varied by adjusting the position of the end $b'$. The whole frame $c'$ $d'$ $e'$ $f'$ $g'$, and all the slate frames, are clamped and locked together, and are now moved towards the drills K, which will bore through one corner of each slate-frame, as indicated in fig. 1. The whole device is then revolved, the spring-catch $f'$ being thrown out of the notch in the disk $d'$; and then another corner of the frames is brought against the drills, and the two other corners in each will then be perforated in a similar manner, as above described, by simply turning the plate $e'$ as far around as required to bring the corner to the drills.

It may be as easy to bore two holes at a time through the corners of the frames. In that case, two drills O O would have to be arranged on a level with each other, and the slate-frame be held in a similar manner as above described. A series of such drills may, in this latter case, be arranged one above the other to bore holes through the corners of a number of frames at once. But when it should be found more practicable or desirable to operate on but one frame at a time I would prefer to use the device P for holding the frame, which is shown in figs. 1 and 3. In this a bed, $i'$, having a dove-tail groove, is firmly secured in position, and a plate, $k'$, sliding therein, is provided with a rectangular rest, $l'$, against which one corner of the frame fits. Another rectangular rest, $m'$, is secured at its corner to a hinged lever, $n'$, by which it may be pressed against the other corner of the frame. The drills O, when arranged so as to bore two holes at once in each frame, are arranged to shafts Q, on which pinions $o'$ are mounted, and to which motion is imparted by a toothed wheel, $p'$, which is mounted on a horizontal shaft, $q'$, the latter being arranged between the shafts Q. When larger or smaller frames are made, so that the drills O must be farther or less apart from each other, it will be necessary to move the shafts Q more or less apart, and their bearings must therefore be arranged so that they can be moved as required. It will then only be necessary to change the toothed wheel $p'$, and to move the shafts Q as far apart as necessary. The frames will now only require the insertion of the pegs, but the latter are not provided to the exact lengths required, and will project more or less from the sides of the frame. Their ends must then be cut off by a revolving cutter, R, fig. 1, mounted on a vertical shaft, $r'$. The frame is moved on a platform, $s'$, and a strip, $t'$, guides it so that the cutter will just shave off the ends of the pegs, no more nor less. The frame is then finished.

Should it be found desirable to mitre the strips after they have been planed and grooved in the trough C, and not on the bed A, it will be necessary to construct a table, S, in front of a revolving saw, T, which is mounted on a horizontal shaft, $u'$. Pins $v'$ are arranged on a sliding plate, $w'$, that is on the table S, and between these pins the strip to be mitred is held in the proper position so as to be fed to the saw T at an angle of forty-five degrees.

Should it be found desirable to make a slate-frame with rounded corners the strip is to be placed upon a revolving plate, U, on which plates or pins $a''$ are arranged, whereby the strip is held in proper position, the said plate U being pivoted to a table or platform, W. The revolving knife R, or any other revolving knife, is then used to cut off and round the corner of the strip in such a manner that when fitted together the corners of the frame will appear as is shown in fig. 9, which is a face view of a slate-frame having rounded corners.

I am aware that the corners of slate-frames are already rounded by machinery, but they are rounded after the frame has been fitted together, while I round the end of each separate strip.

The different shafts, horizontal as well as vertical, used in this machine, are all mounted in suitable bearings, and receive motion either by belts from one common shaft V, or by any other suitable device.

Having thus described my invention, what I claim as new, and desire to secure by Letters Patent, is—

1. The construction of the frame-holding device N, consisting of the sidewise adjustable bed $b'$, sliding table $c'$, notched horizontal disk $d'$, spring-catch $f'$, oblong plate $e'$, fitting over pins on the disk $d'$, hinged arms $g'$, and horizontal locking bars $h'$, substantially as described for the purpose specified.

2. The construction of the slate-holder P, consisting of the lid $i$, in which the plate $k'$ slides, rectangular rest $l'$, against which one corner of the frame fits, and rectangular rest $m'$, having hinged lever $n'$ secured thereto, substantially as described for the purpose specified.

3. The trough $c$, arranged in relation with the cutters D D, saw $e$, concave cutters E, cutters F, spring-roller $m$, and rollers $g\ g$, when constructed and operating substantially as described for the purpose specified.

4. The construction of the revolving drills K, crank-shafts L, having bearings in the uprights M, and fitting in the vertical bar $t$, connected to the eccentrics upon the shaft $u$, all operating as described, and arranged in relation with the frame-holding device N, substantially as described for the purpose specified.

WM. KESTER.

Witnesses:
WM. F. McNAMARA,
ALEX. F. ROBERTS.